(12) United States Patent
Wei-Yi et al.

(10) Patent No.: US 12,481,972 B2
(45) Date of Patent: Nov. 25, 2025

(54) TOUCH SENSITIVE PAYMENT VEHICLE DETECTION SYSTEM

(71) Applicant: Toshiba Global Commerce Solutions Holdings Corporation, Tokyo (JP)

(72) Inventors: Hsuan Wei-Yi, Taipei (TW); Yi-Hsin Huang, Taipei (TW); Ying-Chi Chou, Chiayi (TW); Wen-Fu Tsai, New Taipei (TW)

(73) Assignee: Toshiba Global Commerce Solutions, Inc., Durham, NC (US)

( * ) Notice: Subject to any disclaimer, the term of this patent is extended or adjusted under 35 U.S.C. 154(b) by 387 days.

(21) Appl. No.: 17/860,168

(22) Filed: Jul. 8, 2022

(65) Prior Publication Data
US 2024/0013183 A1 Jan. 11, 2024

(51) Int. Cl.
*G06Q 20/20* (2012.01)
*G06F 3/041* (2006.01)
*G06F 3/044* (2006.01)
*G06K 7/08* (2006.01)

(52) U.S. Cl.
CPC ....... *G06Q 20/204* (2013.01); *G06F 3/04166* (2019.05); *G06F 3/044* (2013.01); *G06K 7/087* (2013.01)

(58) Field of Classification Search
CPC ............... G06Q 20/202; G06Q 20/204; G06F 3/04166; G06F 3/044; G06F 3/048; G06K 7/087
See application file for complete search history.

(56) References Cited

U.S. PATENT DOCUMENTS

| | | | |
|---|---|---|---|
| 2015/0199667 A1* | 7/2015 | Fernando | G06Q 20/202 705/21 |
| 2015/0199668 A1* | 7/2015 | Fernando | G06Q 20/202 705/16 |
| 2015/0199882 A1* | 7/2015 | Fernando | G07G 1/0018 345/173 |
| 2015/0261981 A1 | 9/2015 | Ogomi et al. | |
| 2015/0302226 A1 | 10/2015 | Li et al. | |
| 2016/0005020 A1* | 1/2016 | Fernando | G06Q 20/202 705/21 |
| 2016/0266662 A1 | 9/2016 | Fullerton et al. | |
| 2019/0317564 A1* | 10/2019 | Hamann | G06F 1/1628 |
| 2022/0137782 A1* | 5/2022 | Seger, Jr. | G06F 3/04182 345/156 |

* cited by examiner

*Primary Examiner* — Ernest Unelus
(74) *Attorney, Agent, or Firm* — COATS & BENNETT, PLLC (57) ABSTRACT

A Projected Capacitive (PCAP) display including multiple arrays of conductive electrodes performs a dual function. In a first function, the PCAP display uses the conductive electrode arrays to generate an electrostatic field and determines the presence and position of a conductive object based on small changes it detects in the capacitance of that electrostatic field. In a second function, the PCAP display uses the same conductive electrode arrays to generate a magnetic field. As a user swipes the card across the surface of the PCAP display, it causes small changes in the generated magnetic field. The PCAP display retrieves the data magnetically encoded onto the magnetic stripe card based on the changes it detects in the magnetic field.

17 Claims, 9 Drawing Sheets

PROCESSING CIRCUITRY
100

CAPACITIVE SENSOR ARRAY CONTROL UNIT/MODULE
110

CONDUCTIVE OBJECT DETECTION AND POSITION DETERMINATION UNIT/MODULE
112

MSR UNIT/MODULE
114

POINT-OF-SALE (POS) PROCESSING UNIT/MODULE
116

GRAPHICAL USER INTERFACE (GUI) CONTROL UNIT/MODULE
118

COMMUNICATIONS UNIT/MODULE
120

FIG. 9

TOUCH SENSITIVE PAYMENT VEHICLE DETECTION SYSTEM

BACKGROUND

Currently, a wide array of technology is available with which to obtain information from a user. Such technologies include, for example, Magnetic Stripe Readers (MSRs) and Projected Capacitive (PCAP) displays. MSRs are hardware devices that read data that has been encoded onto a magnetic strip of a magnetic stripe card or badge. PCAP displays detect when a conductive object, such as a human finger or a stylus, for example, touches or comes into close proximity of the PCAP display. Regardless of the particular type of technology, however, both MSRs and PCAP displays are extensively used in various contexts such as security and retail.

DETAILED DESCRIPTION

Embodiments of the present disclosure provide a Projected Capacitive (PCAP) display specially configured to perform a dual function. In a first function, the PCAP display detects the presence and position of a conductive object (e.g., a human finger) relative to the surface of the PCAP display. In a second function, the PCAP display reads data magnetically encoded onto the magnetic strip of a magnetic stripe card that is being held proximate to, or swiped across the surface of, the PCAP display. According to the present embodiments, reading the magnetically encoded data from the magnetic stripe card is accomplished using the arrays of conductive sensors that comprise the PCAP display rather than a separate Magnetic Stripe Reader (MSR) device.

In more detail, aspects of the present disclosure electrically drive multiple arrays of conductive sensors in the PCAP display to generate both an electrostatic field and a magnetic field. The PCAP display then detects changes in both generated fields. Particularly, the arrays of conductive sensors detect small changes in the capacitance of the electrostatic field whenever one or more capacitive objects (e.g., one or more human digits) contacts, or is at least proximate to, a surface of the PCAP display. Based on the detected changes in the electrostatic field, the PCAP display determines the presence and position of the conductive object(s) relative to the surface of the PCAP display, and thereafter, uses that information to perform an associated application function.

Additionally, the arrays of conductive sensors also detect small changes in the generated magnetic field whenever a magnetic stripe card is swiped across, or is held in close proximity to, the surface of the PCAP display. Based on the detected changes in the magnetic field, the PCAP display obtains the magnetically encoded data from the magnetic stripe card and utilizes that data in the performance of a selected application function.

Figure 1:
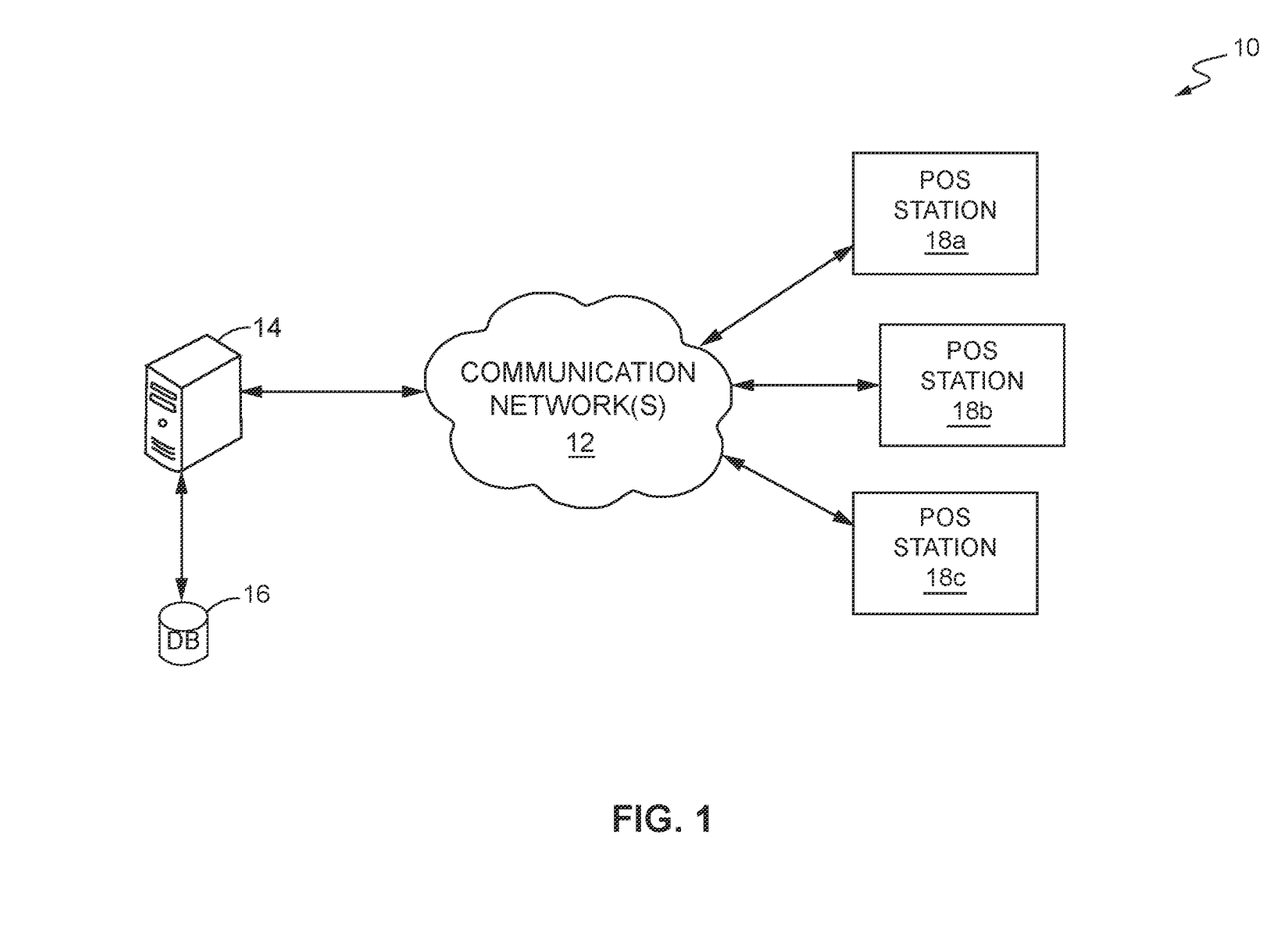
FIG. 1 is block diagram illustrating a communications system for a retail environment configured according to one embodiment of the present disclosure.

Referring now to the drawings, FIG. 1 is block diagram illustrating a system 10 configured according to embodiments of the present disclosure. In the embodiment of FIG. 1, system 10 is illustrated and described in the context of a computer system for a retail business (e.g., WALMART, HOME DEPOT, TARGET, COSTCO, restaurants, etc.), and functions to provide Point-of-Service (POS) solutions to the customers of these businesses. However, those of ordinary skill in the art should readily appreciate that the discussion of system 10 in a retail context is merely for illustrative purposes and ease of discussion. As described in more detail later, system 10 is also suitable for use in connection with a security context in which access to a secure area or secure software function is controlled.

As seen in FIG. 1, system 10 comprises a communications network 12 communicatively interconnecting an application server (AS) 14 and one or more Point-Of-Sale (POS) stations 18a, 18b, 18c (collectively referred to herein as "POS stations 18"). A database (DB) 16 or other mass storage device may also be connected to AS 14 and is configured to store information and data generated for, and utilized by, system 10.

Communications network 12 may comprise one or more public and/or private data networks that use, for example, the Internet Protocol (IP) to communicate data packets between components. Such networks are well-known in the art and include networks that are globally accessible by users (e.g., the Internet), as well as Local Area Networks (LANs), Wide Area Networks (WANs), and enterprise networks. In some cases, communications network 12 may comprise one or more wireline networks (e.g., ETHERNET). In other cases, communications network 12 may comprise one or more wireless networks in addition to, or in lieu of, one or more wireline networks.

AS 14 comprises one or more computer servers accessible by the POS stations 18 via communications network 12. In general, AS 14 provides centralized processing services to the POS stations 18. Such services may include, but are not limited to, data processing services (e.g., processing data according to one or more predefined business-context rules), provisioning services (e.g., for provisioning the POS stations 18 and/or other devices not specifically seen in FIG. 1 with default/updated rule sets, data, and configuration settings), and verification/authorization services (e.g., username/password verification, payment authorization, customer identification, etc.).

Figure 2A:
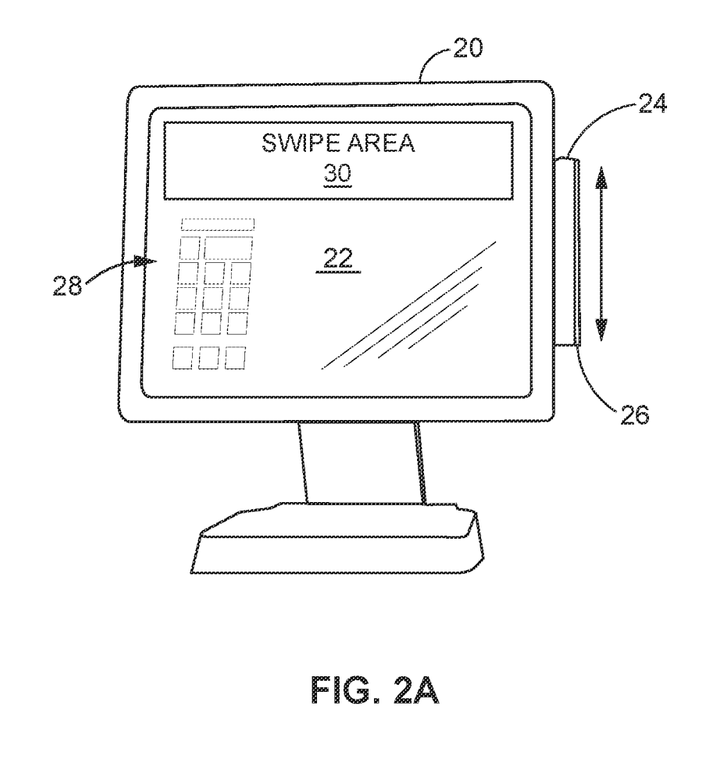
FIGS. 2A-2B illustrate a projected capacitive (PCAP) display configured according to one embodiment of the present disclosure.
Figure 2B:
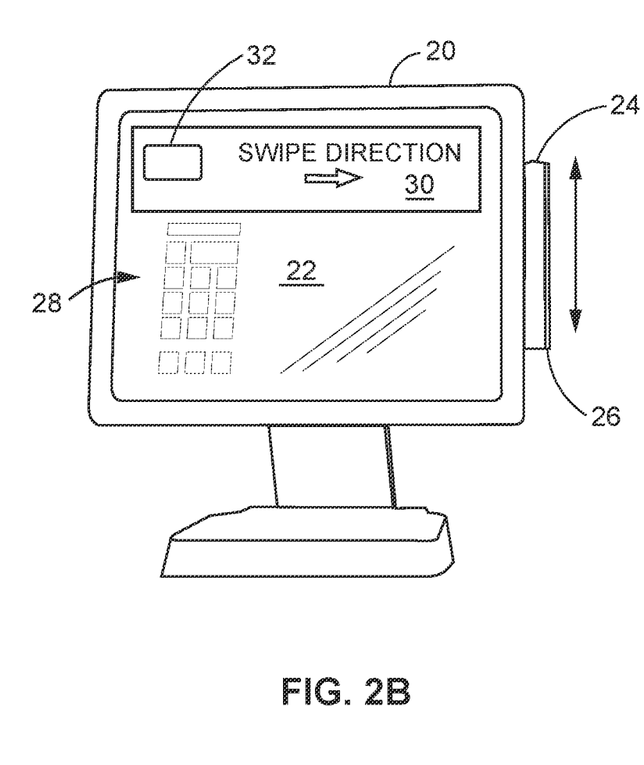

FIGS. 2A-2B illustrate a PCAP display 20 configured according to one embodiment of the present disclosure. As seen in this embodiment, PCAP display 20 may be a stand-alone device, such as a POS terminal configured to facilitate retail transactions. However, as those of ordinary skill in the art should understand, PCAP display 20 configured according to the present disclosure is not so limited. In other embodiments, PCAP display 20 may be integrated into a POS station 18 (regardless of whether it is an employee-assisted POS station 18 or a Self-Checkout (SCO) POS station 18), or as part of a POS kiosk, for example.

The PCAP display 20 of FIGS. 2A-2B comprises a display surface 22 and an MSR device 24. As is conventional, a user input/output (I/O) section 28 is displayed on the display surface 22 in the form of a graphical user interface (GUI) and comprises various buttons and controls that facilitate user (e.g., a customer) interaction with PCAP display 20. For example, the buttons and controls may allow the user to identify items being purchased (as well as the various properties and characteristics for the items), or being returned, or to identify themselves to system 10. In many cases, the buttons and controls may allow certain store personnel (e.g., managers) to access protected software functions executing on the PCAP display 20. Such functions include, but are not limited to, manager overrides and removing items from a customer's list of items being purchased. In these scenarios, PCAP display 20 would be configured to function as a POS terminal for a customer, as well as to authorize/verify a store employee to perform certain protected software functions.

More particularly, and as described in more detail later, the PCAP display 20 comprises multiple arrays of capacitive sensors that can detect small changes in capacitance whenever a conductive object (e.g., a stylus or a human digit) touches or is positioned proximate the display surface 22. Based on the detected changes in capacitance, PCAP display 20 can accurately determine the location of the conductive object relative to the display surface 22. Then, based on the determined location, PCAP display 20 can identify a corresponding software control or button displayed in the I/O section 28 and execute a corresponding POS-related software function.

The MSR device 24 is also a conventional device, and in this embodiment, is attached to an outer surface of PCAP display 20. In other embodiments, the MSR device 24 may be a stand-alone device communicatively connected to PCAP display 20 via, for example, a hardware port. In operation, a user slides a credit card (or similar payment vehicle) through a slot 26 in MSR device 24. As the card slides through slot 26, MSR device 24 reads the data encoded onto a magnetic strip of the card. That data is then used by PCAP display 20 to perform a POS function, such as a customer payment function, for example.

Currently, POS systems, such as those that utilize a PCAP display 20, for example, are becoming smaller and thinner. However, the MSR device 24 still requires some amount of space when attached to the PCAP display 20. Even when the MSR device 24 is a stand-alone device (e.g., it sits on a tabletop near the PCAP display), it still requires space on the tabletop and a connection to an electrical source, not to mention a communications bus through which it can communicate data and other signals with PCAP display 20.

The present embodiments, however, address such situations by configuring the same arrays of capacitive sensors that generate the electrostatic field for PCAP display 20 to also obtain the data magnetically encoded onto the magnetic strip of a magnetic stripe card 32. In more detail, the present embodiments configure at least a predetermined portion of the capacitive sensor arrays to also generate a magnetic field. This specially configured area of PCAP display 20 is graphically indicated to a user as swipe area 30. When the user moves the magnetic stripe card 32 across swipe area 30, it causes small changes or disturbances in the magnetic field. The portion of the capacitive sensor arrays comprising swipe area 30 then output these disturbances as electrical signals that are interpreted as the data magnetically encoded onto the magnetic strip of magnetic stripe card 32.

Thus, a PCAP display 20 configured to operate according to the present embodiments will continue to detect changes in capacitance of a generated electrostatic field to determine the presence and position of a conductive object, as is conventional. In addition, however, PCAP display 20 will also be configured to obtain data that has been magnetically encoded onto the magnetic strip of a magnetic stripe card 32 when the user swipes the magnetic stripe card 32 across a designated swipe area 30 of PCAP display 20. By configuring the capacitive sensor arrays of PCAP display 20 to read magnetically encoded data as well as detect the presence and position of a conductive object, physical MSR readers 24 and their associated software and hardware are no longer needed. Not only does this address the current space and size concerns with respect to PCAP displays, but it also saves retailers money, which can be passed to consumers in the form of lower costs.

Figure 3:
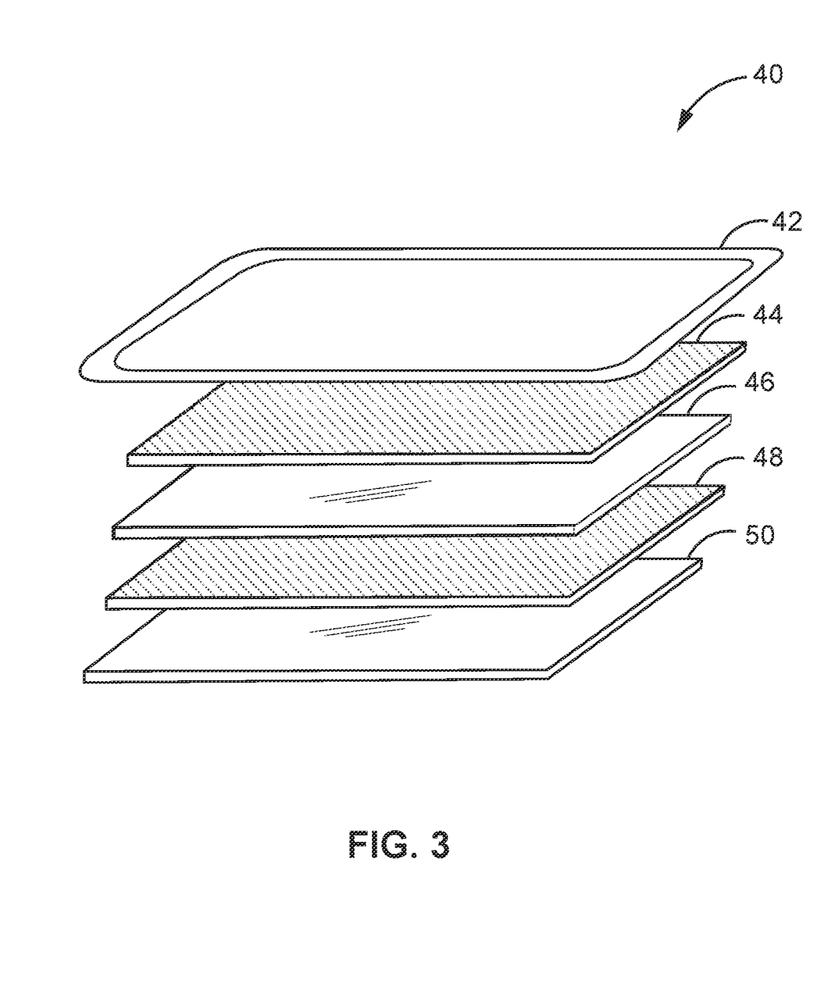
FIG. 3 illustrates an example structure of a POS terminal configured according to one embodiment of the present disclosure.

FIG. 3 illustrates an example structure 40 of a PCAP display 20 configured according to one embodiment of the present disclosure. As seen in FIG. 3, structure 40 comprises a plurality of different layers that are bonded together. Although various PCAP displays 20 may be different, the structure 40 of this embodiment comprises a cover layer 42, a first optical adhesive layer 44, a first capacitive sensor array 46, a second optical adhesive layer 48, and a second capacitive sensor array 50. As those of ordinary skill in the art will readily appreciate, other layers may also be present but are not necessarily shown in the figures.

The cover layer 42 is the outermost layer of structure 40 and typically comprises a thin piece of glass. Generally, cover layer 42 functions as a shield to protect the first and second capacitive sensor arrays 46, 50, and the other underlying layers, from external elements and damage. As for the first and second adhesive layers 44, 48, they comprise optically clear adhesives (OCAs) that bond the cover layer 42 to the first capacitive sensor array 46, and the first capacitive sensor array 46 to the second capacitive sensor array 50, respectively.

In at least one embodiment, the first and second adhesive layers 44, 48 are liquid OCAs that fill the gaps between the different layers 42, 46, and 50. OCAs are specially configured to minimize light reflections, thereby improving the optical characteristics of PCAP display 20. However, those of ordinary skill in the art will appreciate that the present embodiments are not so limited. Other embodiments may use, for example, an optically clear resin (OCR) for the first and second adhesive layers 44, 48. OCRs are transparent resin sheets that also fill the gaps between layers 42, 46, and 50 and improve the optical characteristics of PCAP display 20. Structure 40 may use other adhesives, as is known in the art, or may use none. In these latter embodiments, air fills the gap between layers 42, 46, and 50.

Each of the first and second capacitive sensor arrays 46, 50 comprises a corresponding array of conductive sensors on a substrate and forms a respective conductive matrix. Typically, one of the first and second capacitive sensor arrays 46, 50 is considered to be a "transmit" layer (commonly referred to as the "X" layer) while the other of the first and second capacitive sensor arrays 46, 50 is considered to be a "receive" layer (commonly referred to as the "Y" layer). The conductive sensors comprising the first and second capacitive sensor arrays 46, 50 may be arranged according to any order needed or desired. In at least one embodiment, however, the first and second capacitive sensor arrays 46, 50 are laid out in a "column-row" arrangement that forms a grid. For example, the conductive sensors of the first capacitive sensor array 46 may be laid out on the substrate in multiple rows that are substantially parallel to each other. The conductive sensors of the second capacitive sensor array 50, in contrast, may be laid out on the substrate in multiple columns that are substantially parallel to each other and also substantially perpendicular to the conductive sensors of the first capacitive sensor array 46. With this arrangement, the first and second capacitive sensor arrays 46, 50 form a conductive matrix of sensors that enable PCAP display 20 to accurately determine the presence and position of a conductive object relative to the PCAP display 20.

In more detail, an electrostatic field the "X" layer (e.g., the first capacitive sensor array 46) generates an electrostatic field responsive to being provided with an electrical current. Thereafter, whenever a finger or other conductive object approaches or contacts the surface of PCAP display 20, it causes small changes in the capacitance of the electrostatic field. The "Y" layer (e.g., the second capacitive sensor array 50) detects (e.g., "receives") these small changes and generates corresponding electrical signals that are provided to a controller (e.g., processing circuitry) that controls the operation of the PCAP display 20. Based on these signals, the controller identifies the areas or elements of the conductive matrix (i.e., the particular sensors in the first and second capacitive sensor arrays 46, 50) having the greatest change, and uses that information to determine the presence and position of the conductive object(s).

For example, the controller in one embodiment triangulates the touch position(s) within the X and Y layers to determine the presence and position of the conductive object(s) relative to PCAP display 20. Information (e.g., coordinate value(s)) representing the determined presence and position of the conductive object(s) may then be used to launch and/or execute an appropriate target function. By way of example only, the target function may be associated with a POS transaction performed by POS display 20, such as a purchase or a return transaction, or may be associated with a security transaction, such as verifying the identity of a person, authorizing a person to access a secure area, and/or authorizing a person to initiate and/or interact with a protected software function.

As stated above, the embodiments described herein configure the conductive matrix of PCAP display 20 to also generate a magnetic field. Particularly, the electrical current provided to one or both of the first and second capacitive sensor arrays 46, 50 is also used to cause those arrays 46, 50 to generate the magnetic field. Whenever the user swipes a card or badge across the surface of PCAP display 20 (e.g., magnetic stripe card 32 through swipe area 30), data magnetically encoded onto the magnetic strip of magnetic stripe card 32 causes small changes in the generated magnetic field. The conductive matrix detects these changes as changes in "flux" and generates analog signals representing the changes to send to the controller. Upon receipt of the analog signals, the controller generates corresponding digital data (i.e., 0s and 1s) representing the data that is magnetically encoded onto the magnetic stripe card 32.

Figures 4A, 4B:
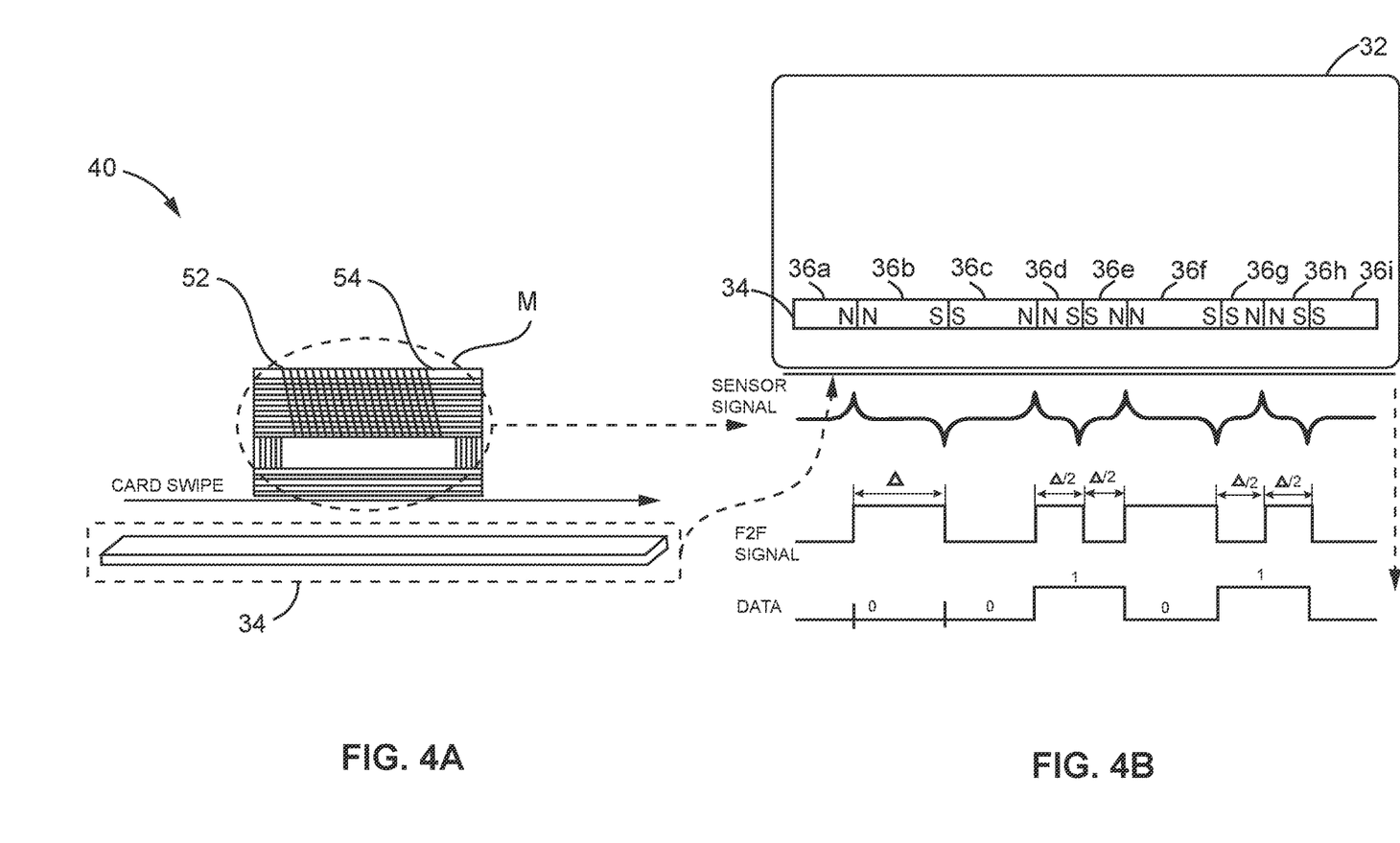
FIGS. 4A-4B illustrate how encoded data on the magnetic strip of a magnetic strip card is read using the PCAP structure of FIG. 3 according to one embodiment of the present disclosure.

FIGS. 4A-4B illustrate how data that has been magnetically encoded onto a magnetic strip 34 of a magnetic stripe card 32 is read using the PCAP structure 40 according to one embodiment of the present disclosure. Particularly, the magnetic strip 34 of a magnetic stripe card 32 comprises a plurality of metallic-based particles 36a, 36b, 36c, 36d, 36e, 36f, 36g, 36h, 36i (collectively referred to herein as "metallic-based particles 36") arranged in a strip 34 encapsulated in a plastic tape. Each metallic-based particle 36 functions as a bar magnet and is, at least initially, polarized in the same direction as all the other metallic-based particles 36 in the magnetic strip 34. With this initial polarization, the magnetic strip 34 is effectively "blank," meaning that there no data encoded on the magnetic strip. To magnetically encode data onto magnetic strip 34, the metallic-based particles are magnetized. In one embodiment, for example, a special electromagnetic writer called an encoder writes information onto the magnetic strip 34 by magnetizing the metallic-based particles 36 in either a north (N) or south (S) pole direction. The process of writing information onto the magnetic strip 34 is commonly referred to as "flux reversal." And as seen in FIG. 4B, there are two different flux reversals—i.e., N—N and S—S. These flux reversals can be thought of as two different information states (i.e., '0' or '1').

As previously described, the first and second capacitive sensor arrays 46, 50 of structure 40 are driven by an electrical current via electrical leads 52, 54. In response, structure 40, one or both of the first and second capacitive sensor arrays 46, 50, generates a magnetic field M. As the user swipes magnetic stripe card 32 across swipe area 30 of PCAP display 20, one or both of the first and second capacitive sensor arrays 46, 50 detect the changes in the magnetic field M caused by the "flux reversals" on magnetic strip 34 (see FIG. 4B). Analog signals are then output to the controller, which are then converted to a digital equivalent.

For example, as seen in FIG. 4B, the analog signal output by the first and/or second capacitive sensor arrays 46, 50 forms a "peak" in the signal whenever two adjacent metallic-based particles polarized as "N—N" (e.g., 36a, 36b) are detected, and a "trough" whenever two adjacent metallic-based particles polarized as "S—S" (e.g., 36b, 36c) are detected. These "peaks" and "troughs" in the analog signal form the leading edges and the trailing edges of the digital signal, respectively. The data encoded on the magnetic strip 34 can then be determined based on the digital signal.

In this embodiment, the data gleaned from the converted digital signal is "time-based." Thus, longer periods of time Δ between the detected flux reversals result in a data bit of '0'. However, multiple flux reversals Δ/2 detected during the same or shorter time interval result in a data bit of '1'. Thus, even though the first and second capacitive sensor arrays 46, 50 of PCAP display 20 function to detect changes in capacitance, the present embodiments configure those same capacitive sensor arrays 46, 50 to perform an additional function—i.e., to detect the data magnetically encoded onto the magnetic strip 34 of magnetic stripe card 32 so that the data can be obtained and used in performing a variety of corresponding functions (e.g., POS functions and security access functions).

Figure 5:
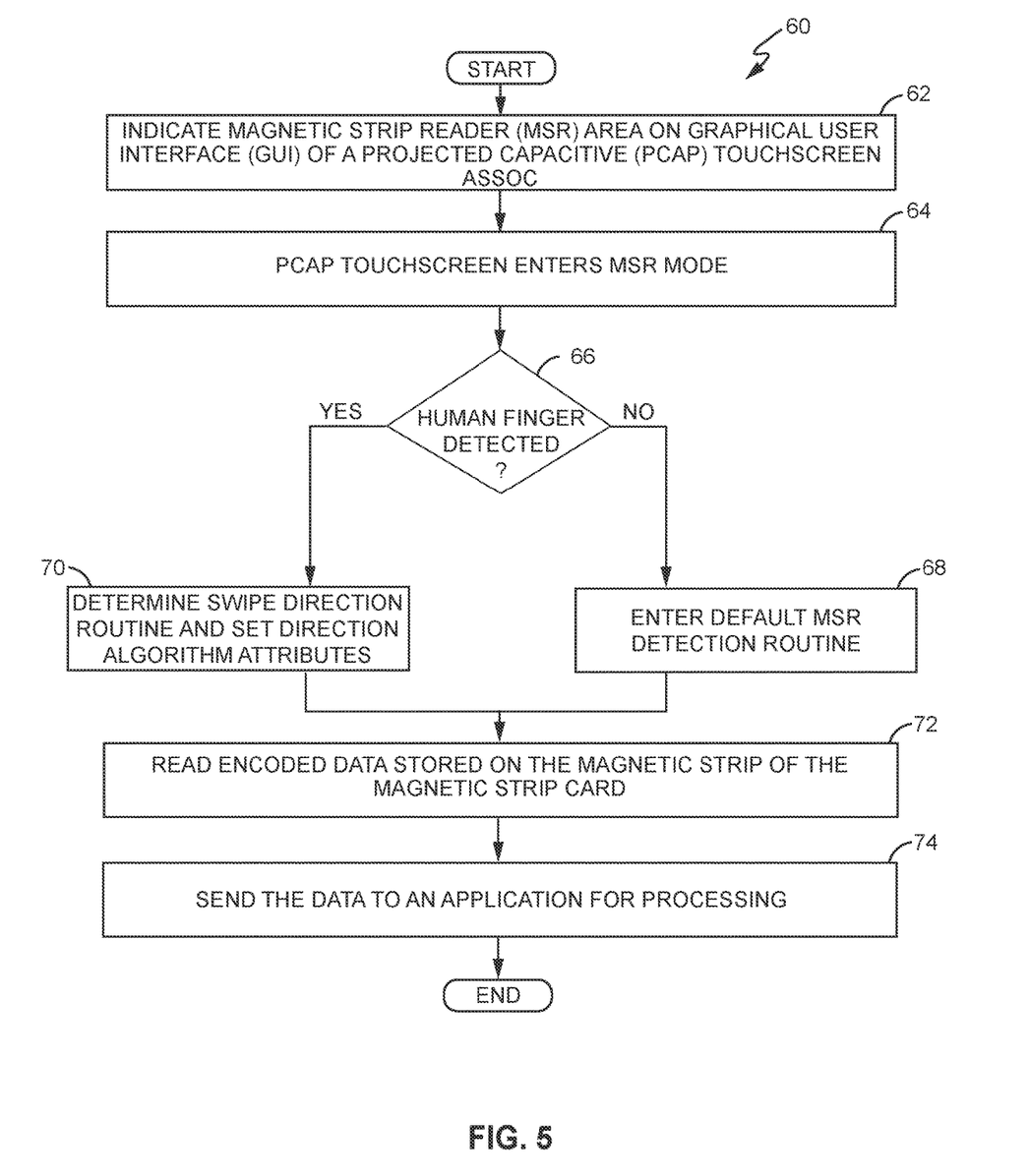
FIG. 5 is a flow diagram illustrating a method for retrieving encoded data from a magnetic strip card and for utilizing the encoded data to process a POS transaction according to one embodiment of the present disclosure.

FIG. 5 is a flow diagram illustrating a method 60 for retrieving magnetically encoded data from the magnetic strip 34 of a magnetic stripe card 32, and for utilizing that data in the processing of a POS transaction according to one embodiment of the present disclosure. As seen in FIG. 5, method 60 begins with outputting a graphical user interface (GUI) to PCAP display 20, and visually indicating the swipe area 30 to the user (box 62). Method 60 may be triggered to begin, for example, by a store employee (e.g., a cashier) initiating a POS transaction or by the user initiating a POS transaction at a SCO station.

The swipe area 30 may be graphically indicated to the user by highlighting the swipe area 30 and/or by animating graphics associated with the swipe area 30. In one embodiment, the swipe area 30 may be indicated to the user as being the entire display surface 22 of PCAP display 20. In other embodiments, such as the embodiment seen in FIGS. 2A and 2B, for example, only a portion of the display surface 22 is indicated as being the swipe area 30. Additionally, the GUI displayed on PCAP display 20 may provide some helpful information to the user and/or the store employee indicating a particular way to hold the card 32 and/or the direction in which to swipe the card 32 across PCAP display 20. In any case, the indicated swipe area 30 is the part of the display surface 22 that will be used to retrieve the data magnetically encoded on a magnetic stripe card 32 (e.g., a user's credit card). So indicated, method 60 enables the MSR reader mode of PCAP display 20 (box 64). While in the MSR mode, one or both of the first and second capacitive sensor arrays 46, 50 of PCAP display 20, or a predetermined portion of those arrays, are configured to perform the MSR functions conventionally implemented by MSR device 24.

While in the MSR mode, the controller that controls the operation of PCAP display 20 may implement a variety of functions in accordance with the present disclosure. In one embodiment, for example, the controller may alter the transmit/receive sequence of the first and second capacitive sensor arrays 46, 50. For example, the first capacitive sensor array 46 (e.g., the 'X' layer of structure 40) may be changed from being the transmit layer to a receive layer. Similarly, the second capacitive sensor array 50 (e.g., the 'Y' layer of structure 40) may be changed from being the receive layer to being the transmit layer. In one embodiment, switching the transmit/receive sequence of layers 46, 50 is performed for a predetermined stage of a POS transaction (e.g., accept customer payment). When that stage of the POS transaction is complete, the controller would once again switch the transmit/receive sequence of layers 46, 50 so that layer 46 is once again the transmit layer and layer 50 is once again the receive layer.

In another embodiment, the controller is configured to focus on receiving the output signals from a predetermined area of PCAP display 20. As described above, the predetermined area could be swipe area 30. Therefore, the controller would receive and process only the analog signals output by the first and/or second capacitive sensor arrays 46, 50 that are active for swipe area 30.

In at least one embodiment, a controller operating in the enabled MSR mode could review a current resolution of the first and/or second capacitive sensor arrays 46, 50 and, if needed, increase or decrease the resolution of some or all of the sensors in the arrays 46, 50 to a higher resolution. This may be accomplished, for example, by activating/deactivating selected sensors on the sensor arrays 46, 50. A higher resolution may help PCAP display 20 to perform a more accurate detection and reading of the magnetically encoded data on the magnetic strip 34. Additionally, the controller could be configured to review the electrical current used to drive the first and/or second capacitive sensor arrays 46, 50, as well as the scanning frequency used for detecting the magnetically encoded data, and increase or decrease those as needed.

Next, the controller of PCAP display 20 is configured to determine an algorithm to use in retrieving the data magnetically encoded on the magnetic strip 34. For example, in one embodiment, the controller determines whether a conductive object, such as the user's finger, has been detected by the first and second capacitive sensor arrays 46, 50 (box 66). Such a detection may occur, for example, when the user goes to swipe his/her card 32 along swipe area 30. If no conductive object is detected, the controller may be configured to execute a default MSR reader function (box 68). With the default function, the first capacitive sensor array 46 could be controlled to transmit a signal, thereby generating the magnetic field M, while the second capacitive sensor array 50 would be configured to detect a change in capacitance and output a signal indicating that capacitive change to controller. Additionally, the sensors that comprise the second capacitive sensor array 50 could be scanned in a predetermined order (e.g., sequentially) and frequency so that the controller can determine whether the user is swiping card 32, and if so, the direction in which the user is swiping card 32.

However, if a conductive object is detected (box 66), the controller can use the information to determine a swipe detection routine to execute, as well as set various detection algorithm attributes and parameters (box 70). For example, detecting a conductive object can trigger the execution of a corresponding algorithm that enforces a particular transmit/receive pattern for layers 46, 50, as well as a predetermined swipe direction for card 32. Further, it could also configure the controller to limit detection of the magnetically encoded data to a specific area of PCAP display 20 (e.g., a specific portion of the first and second capacitive sensor arrays 46, 50 in swipe area 30). Additionally, detecting the conductive object may cause the controller to adjust one or both of a driving current, scanning frequency, and/or a scanning sequence. Thus, in these embodiments, the detection of the conductive object by layers 46, 50 will allow these layers to detect and read the data magnetically encoded onto a magnetic strip 34 faster, more efficiently, and with a greater accuracy.

Once the appropriate algorithm has been determined, the first and second capacitive sensor arrays 46, 50 read the encoded data stored on the magnetic strip 34 of card 32, as previously described (box 72). So obtained, the controller sends the data to an application (e.g., a POS transaction-related application) for processing (box 74).

Figure 6:
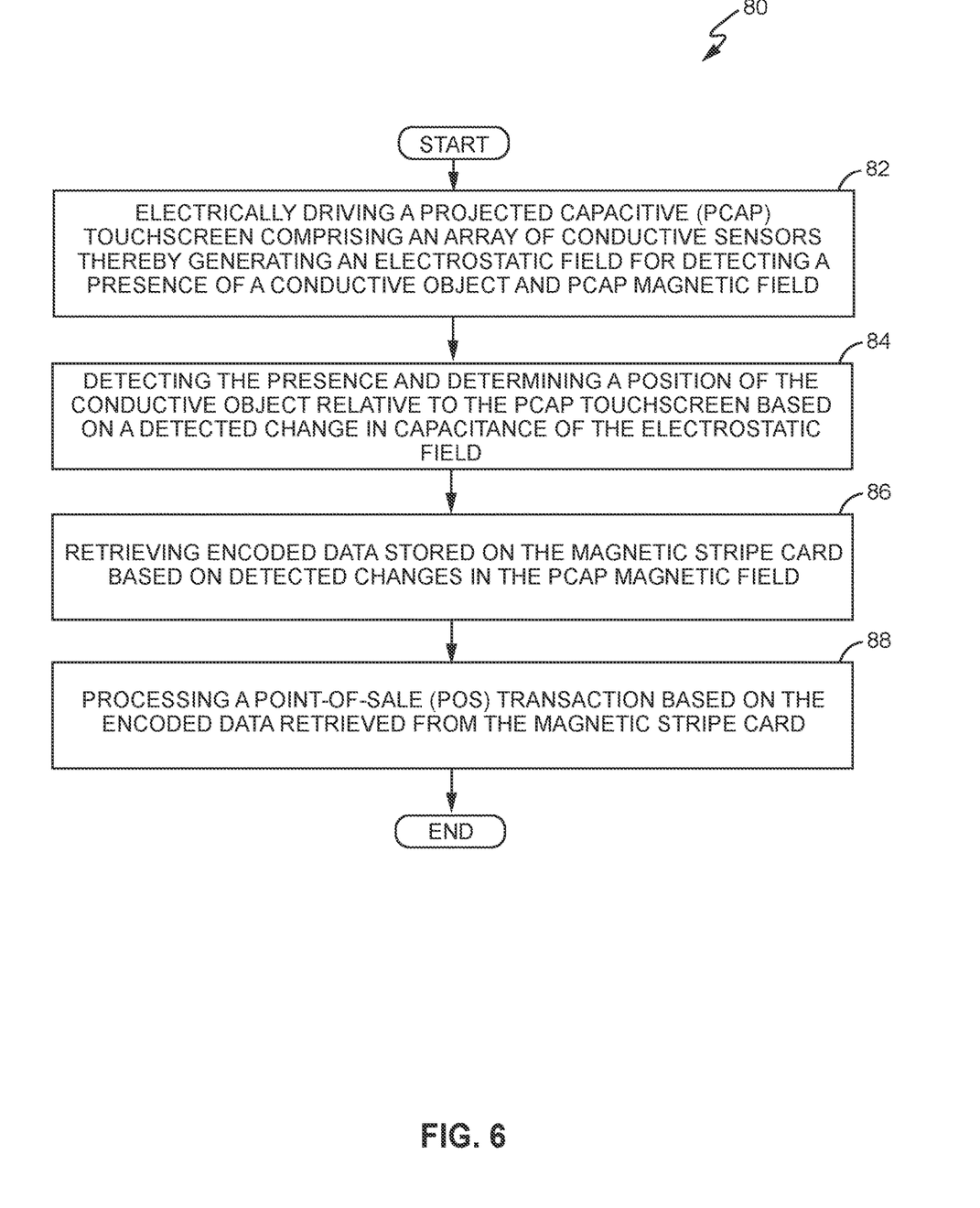
FIG. 6 is a flow diagram illustrating a method for retrieving encoded data from a magnetic strip card according to one embodiment of the present disclosure.

FIG. 6 is a flow diagram illustrating a method 80 for retrieving data encoded onto a magnetic strip card 32 according to one embodiment of the present disclosure. Method 80 may occur, for example, in association with a POS transaction at a retail store, for example.

As seen in FIG. 6, method 80 begins with providing PCAP display 20 with an electrical current thereby causing the first and second capacitive sensor arrays 46, 50 to generate an electrostatic field for detecting the presence and position of a conductive object, and a magnetic field (box 82). PCAP display 20 then detects the presence and position of the conductive object relative to display surface 22 based on a detected change in capacitance of the electrostatic field (box 84). Next, PCAP display 20 retrieves the data magnetically encoded onto the magnetic strip 34 of the user's magnetic stripe card 32 responsive to the user swiping the card 32 across the indicated swipe area 30 of PCAP display 20, as previously described (box 86). So retrieved, the encoded data retrieved from the magnetic strip 34 is used in the processing of the POS transaction (box 88).

Figure 7:
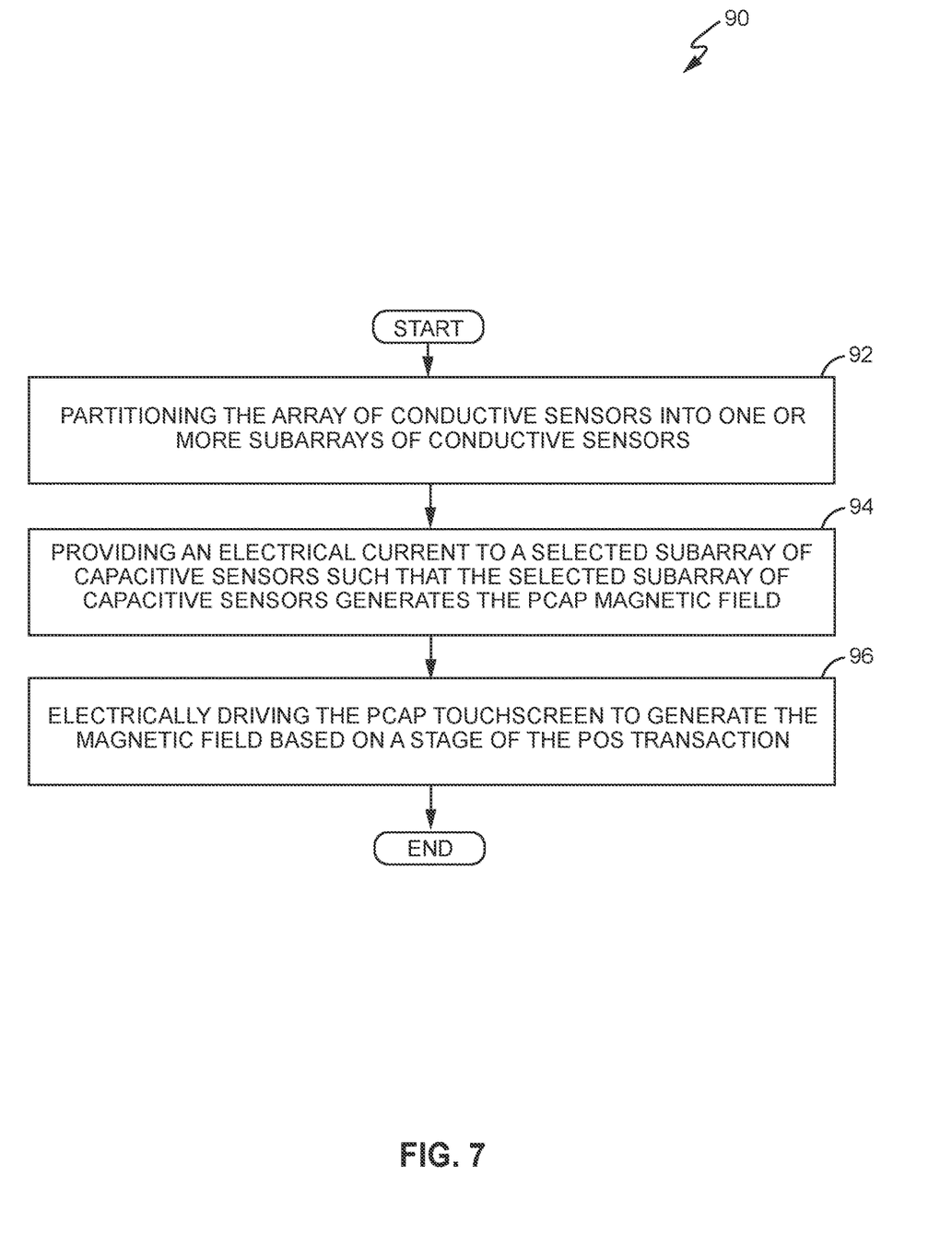
FIG. 7 is a flow diagram illustrating a method for driving a PCAP sensor array according to one embodiment of the present disclosure.

FIG. 7 is a flow diagram illustrating a method 90 for driving a PCAP sensor array according to one embodiment of the present disclosure. As previously described, the present embodiments can configure the entirety of the first and second capacitive sensor arrays 46, 50 to function in the MSR mode, thereby effectively utilizing substantially most, or all, of the display surface 22 as an MSR reader. In other embodiments, however, the controller can configure selected portions of the first and second capacitive sensor arrays 46, 50 of PCAP display 20 such that only part of display surface 22 functions in the MSR mode. Such an area, as previously described, maybe indicated to the user as swipe area 30.

In this embodiment, the controller partitions the first and second capacitive sensor arrays 46, 50 into one or more subarrays of capacitive sensors (box 92). In one aspect, each of the one or more subarrays comprises a portion of the first and second capacitive sensor arrays 46, 50 of PCAP display 20. In another aspect, each subarray comprises its own first and second capacitive sensor arrays 46, 50 that may be powered and/or controlled independently from the first and second capacitive sensor arrays 46, 50 of the other subarrays. In still another aspect, at least two of the subarrays share the same first and second capacitive sensor arrays 46, 50. Regardless of the particular structure, however, once the first and second capacitive sensor arrays 46, 50 have been partitioned, a selected one of the subarrays is provided with the electrical current that causes the selected subarray to generate a magnetic field M (box 94).

One example of such a selected subarray, as previously described, is swipe area 30. In one embodiment, the first and second capacitive sensor arrays 46, 50 associated with the swipe area 30 are selectively controlled to generate the magnetic field M based on a particular stage of a transaction (box 96). For example, in a retail context, the first and second capacitive sensor arrays 46, 50 associated with the swipe area 30 may be controlled to generate an electrostatic field during a POS transaction to determine the presence and position of a human digit relative to display screen 22. However, at one or more predetermined stages of the POS transaction (e.g., a payment stage or a customer identification stage), the first and second capacitive sensor arrays 46, 50 associated with the swipe area 30 may be controlled to generate the magnetic field M so that data encoded onto the user's magnetic stripe card 32 can be retrieved from the magnetic strip 34.

In one embodiment, causing the first and second capacitive sensor arrays 46, 50 associated with the swipe area 30 to generate the different fields may be accomplished by providing different levels of electrical current to the first and second capacitive sensor arrays 46, 50. The particular levels of current may be any levels needed or desired, but in one embodiment, are determined and provided to the first and second capacitive sensor arrays 46, 50 when the controller enters/exits the MSR mode.

Figure 8:
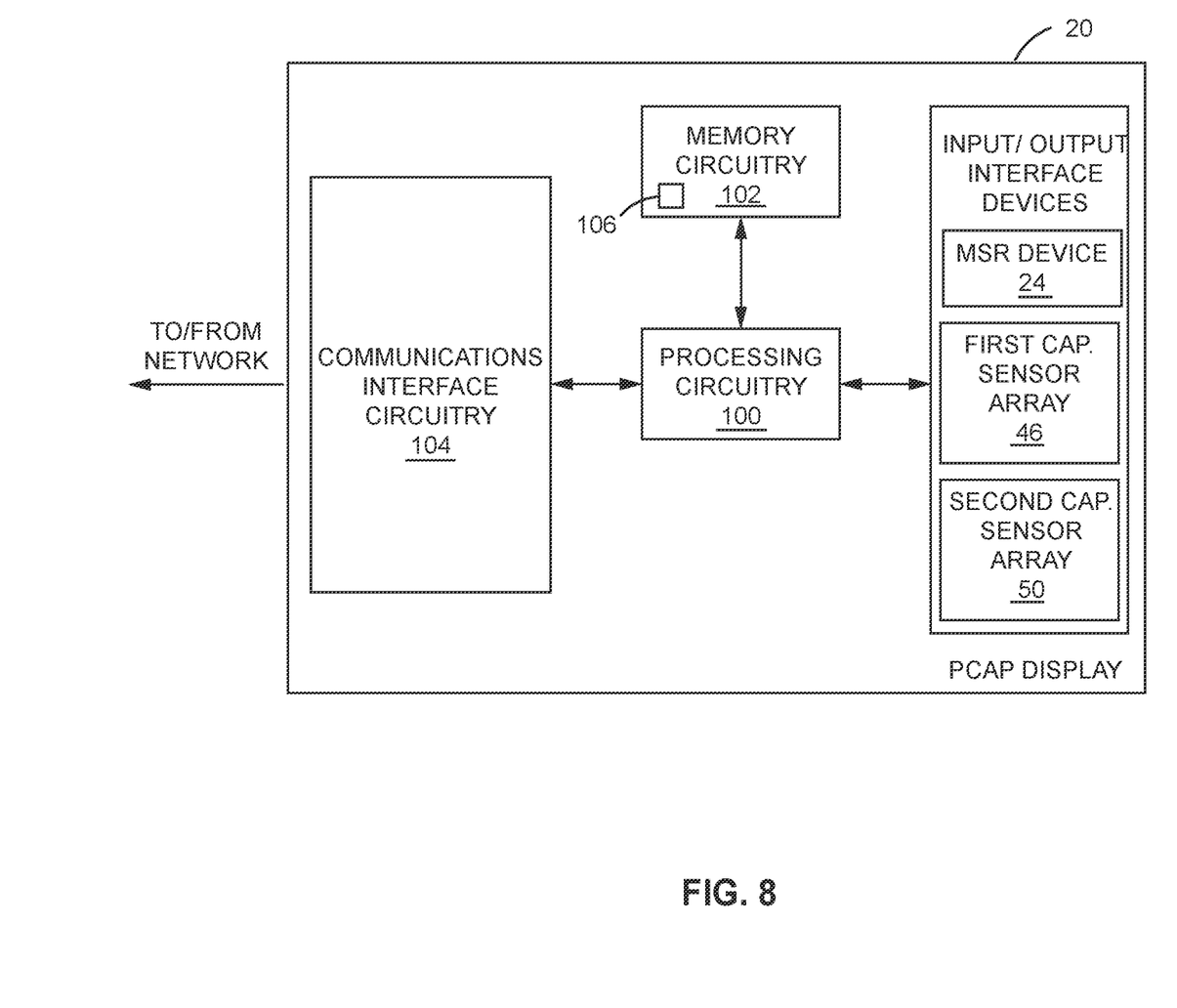
FIG. 8 is schematic block diagram illustrating some component parts of a POS station configured to retrieve encoded data from a magnetic strip card according to one embodiment of the present disclosure.

FIG. 8 is schematic block diagram illustrating some of the functional component parts of a PCAP display 20 configured to retrieve encoded data from a magnetic strip card 32 according to one embodiment of the present disclosure. In this embodiment, PCAP display 20 functions as a POS terminal in a retail context.

As seen in FIG. 8, PCAP display 20 comprises processing circuitry (i.e., controller) 100, memory circuitry 102, an MSR device 24, a first capacitive sensor array 46, a second capacitive sensor array 50, and communications interface circuitry 104.

Processing circuitry 100 comprises one or more microprocessors, hardware circuits, firmware or a combination thereof. In the exemplary embodiments described herein, processing circuitry 100 is configured to control the functions of PCAP display 20 according to instructions and data stored in memory circuitry 102. Additionally, however, processing circuitry 100 is configured to implement the methods of the previously described embodiments. Particularly, as stated above, processing circuitry 100 is configured to operate in a non-MSR mode in which it controls the first and second capacitive sensor arrays 46, 50 to generate the electrostatic field, and in a MSR mode in which it controls at least a portion of the first and second capacitive sensor arrays 46, 50 to generate the magnetic field M, as previously described. So generated, processing circuitry 100 is configured to determine the presence and position of a conductive object relative to its display surface 22 based on the changes it detects in the capacitance of the generated electrostatic field. Further, processing circuitry 100 is also configured to detect and retrieve data magnetically encoded onto the magnetic strip 34 of a magnetic stripe card 32 based on the changes it detects in magnetic field M.

Memory circuitry 102 comprises a non-transitory computer readable medium that stores executable program code and data used by processing circuitry 100 for operation. In this embodiment, the program code and data comprises a control program 106 that, when executed by processing circuitry 100, configures PCAP display 20 to perform the functions previously described. In some embodiments, control program 106 has access to information and data that can be utilized by processing circuitry 100 to selectively control and manage the operation of the first and second capacitive sensor arrays 46, 50, as previously described. Memory circuitry 102 may include both volatile and non-volatile memory, and may comprise random access memory (RAM), read-only memory (ROM), and electrically erasable programmable ROM (EEPROM) and/or flash memory. Additionally or alternatively, memory circuitry 102 may comprise discrete memory devices, or be integrated with one or more microprocessors in the processing circuitry 100.

The input/output (I/O) devices of PCAP display 20, as described above, may comprise an MSR reader device 24 and the first and second capacitive sensor arrays 46, 50. The MSR device 24 is, as stated above, a physical MSR reader that attaches to the external housing of the PCAP display 20. The first and second capacitive sensor arrays 46, 50, which may be partitioned into one or more subarrays, and are controlled to selectively generate both the electrostatic field and the magnetic field M, as previously described. Given that PCAP display 20 comprises the first and second capacitive sensor arrays 46, 50, those of ordinary skill in the art will appreciate that the inclusion of the MSR device 24 on the PCAP display 20 is optional.

The communications interface circuitry 104 comprises, in one embodiment, a transceiver circuit and/or interface circuit for communicating with remote devices over a communication network or direct communication link. For example, the communications interface circuitry 104 may comprise a WiFi interface, a cellular radio interface, a BLUETOOTH interface, an Ethernet interface, or other similar interface for communicating over communications network 12 and/or a wireless communication link. PCAP display 20 may use the communications interface circuitry 104, for example, to communicate with one or more other computing devices (e.g., AS 14 and/or DB 16), as previously described.

Figure 9:
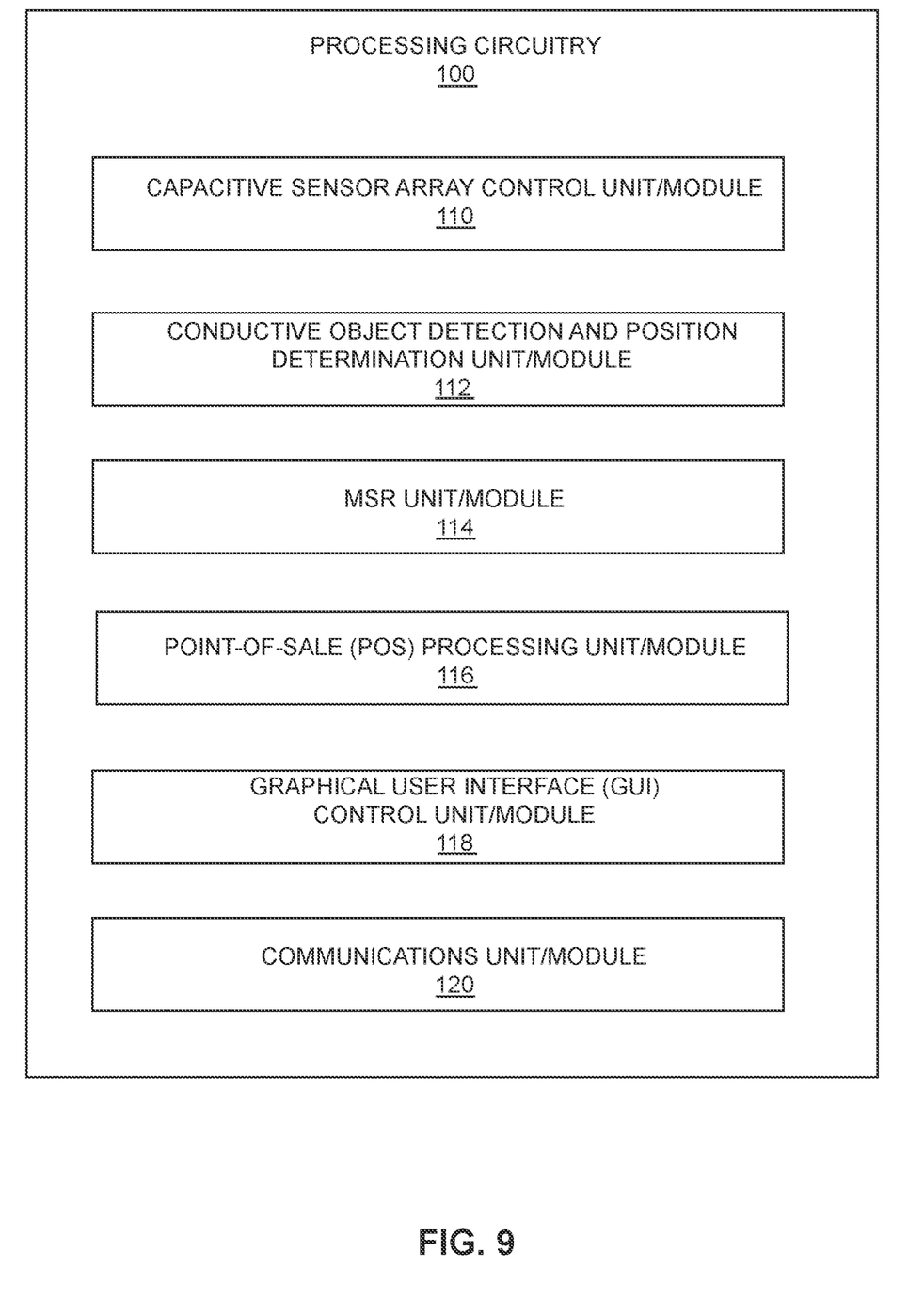
FIG. 9 is a schematic block diagram of a computer program product that configures a POS station to retrieve encoded data from a magnetic strip card according to one embodiment of the present disclosure.

FIG. 9 is a schematic block diagram of a computer program product that configures a PCAP display 20 to retrieve encoded data from a magnetic strip card 32 according to one embodiment of the present disclosure. The computer program product may, for example, comprise control program 106.

As seen in FIG. 9, control program 106 executes on processing circuitry 100 and comprises a capacitive sensor array control unit/module 110, a conductive object detection and position determination unit/module 112, a MSR unit/module 114, a POS processing unit/module 116, a graphical user interface control unit/module 118, and a communications unit/module 120.

The capacitive sensor array control unit/module 110 comprises program code that is executed by processing circuitry 100 to control the first and second capacitive sensor arrays 46, 50 to selectively generate the electrostatic field and the magnetic field M, as previously described. In some embodiments, the capacitive sensor array control unit/module 110 also comprises the program code that is executed by processing circuitry 100 to partition the first and second capacitive sensor arrays 46, 50 into one or more subarrays and select one of those subarrays to function as swipe area 30, as previously described.

The conductive object detection and position determination unit/module 112 comprises program code that is executed by processing circuitry 100 to detect the presence of a conductive object proximate the display surface 22 of PCAP display 20, and to determine its position relative to display surface 22, as previously described.

The MSR unit/module 114 comprises program code that is executed by processing circuitry 100 to obtain data magnetically encoded onto the magnetic strip 34 of a magnetic stripe card 32 when a user swipes the card 32 across a designated swipe area 30 of display surface 22, as previously described. The program code that comprises the MSR unit/module 114 may, as previously described, be selectively enabled and disabled based on a current stage of a transaction.

The POS processing unit/module 116 comprises program code that is executed by processing circuitry 100 to control the POS-related operations and functions of PCAP display 20. As stated above, the POS processing unit/module 116 may receive the data and signals that are detected and retrieved by one or both of the conductive object detection and position determination unit/module 112 and the MSR unit/module 114, as previously described.

The graphical user interface control unit/module 118 comprises program code that is executed by processing circuitry 100 to generate and control the operation of the graphical user interface displayed on PCAP display 20. This includes, but is not limited to, graphically indicating a particular swipe area 30 to a user, as well as providing any other helpful information and/or animations that would help the user understand where to swipe his/her card 32 across display surface 22, as previously described.

The communications unit/module 120 comprises program code that is executed by processing circuitry 100 to facilitate the communication of signals and data with one or more remotely located devices via communications network 12, as previously described.

The present embodiments may, of course, be carried out in other ways than those specifically set forth herein without departing from essential characteristics of the invention. For example, the previous embodiments have been described in the context of a POS transaction at a retail store. However, as previously stated, embodiments of the present disclosure are also suitable for use in a security context. By way of example, a terminal similar to PCAP display 20 may be employed to authorize access to a secure area. Rather than swipe a credit card however, the user seeking access to the secure area could swipe his/her badge. Such a badge would also have a magnetic strip 34 with data identifying the user and their level of access. In this scenario, the user would swipe his/her badge across a designated swipe area of the terminal (e.g., swipe area 30). The data magnetically encoded onto the magnetic strip 34 of the user's badge would then be read by the electrode arrays comprising the terminal and used to authorize, or deny, access to the user.

Therefore, the present embodiments are to be considered in all respects as illustrative and not restrictive, and all changes coming within the meaning and equivalency range of the appended claims are intended to be embraced therein.

What is claimed is:

1. A method for obtaining encoded data from a magnetic stripe card, the method comprising:
    partitioning an array of conductive sensors of a projected capacitive (PCAP) touchscreen into first and second subarrays of conductive sensors, wherein the first and second subarrays of conductive sensors are different from each other and arranged as respective matrices, each matrix comprising a first layer of conductive sensors configured to generate an electrostatic field and a second layer of conductive sensors configured to detect deviations in the electrostatic field;
    electrically driving:
        the first subarray of conductive sensors to generate the electrostatic field for detecting a presence of a conductive object; and
        the second subarray of conductive sensors to generate a PCAP magnetic field; and
    retrieving encoded data stored on the magnetic stripe card based on detected changes in the PCAP magnetic field.

2. The method of claim 1, further comprising enabling a magnetic strip reader (MSR) mode of the PCAP touchscreen.

3. The method of claim 2, further comprising determining a position of the conductive object relative to the PCAP touchscreen based on a detected change in capacitance of the electrostatic field.

4. The method of claim 2, further comprising determining a swipe direction of the magnetic stripe card relative to the PCAP touchscreen based on a detected direction of movement of the conductive object relative to the PCAP touchscreen.

5. The method of claim 2, further comprising:
    determining one or more parameters for the array of conductive sensors, the one or more parameters comprising at least one of:
        a transmit/receive sequence for the array of conductive sensors;
        a resolution for the array of conductive sensors;
        an electrical current with which to electrically drive the array of conductive sensors; and
        a scanning frequency at which the electrostatic field will be scanned to detect changes in capacitance; and
    reading the encoded data stored on the magnetic stripe card according to the one or more parameters when the PCAP touchscreen is in the MSR mode.

6. The method of claim 2, wherein enabling the MSR mode of the PCAP touchscreen comprises selectively activating a MSR function associated with the PCAP touchscreen.

7. The method of claim 1, further comprising processing a Point-of-Sale (POS) transaction based on the encoded data retrieved from the magnetic stripe card.

8. The method of claim 7, further comprising electrically driving the second subarray of conductive sensors to generate the magnetic field based on a stage of the POS transaction.

9. A projected capacitive (PCAP) touchscreen comprising:
an array of conductive sensors; and
processing circuitry operatively connected to the array of conductive sensors and configured to:
partition the array of conductive sensors of the PCAP touchscreen into first and second subarrays of conductive sensors, wherein the first and second subarrays of conductive sensors are different from each other and arranged as respective matrices, each matrix comprising a first layer of conductive sensors configured to generate an electrostatic field and a second layer of conductive sensors configured to detect deviations in the electrostatic field;
electrically drive:
the first subarray of conductive sensors to generate the electrostatic field for detecting a presence of a conductive object; and
the second subarray of conductive sensors to generate a PCAP magnetic field; and
retrieve encoded data stored on a magnetic stripe card based on detected changes in the PCAP magnetic field.

10. The PCAP touchscreen of claim 9, wherein the processing circuitry is further configured to enable a magnetic strip reader (MSR) mode of the PCAP touchscreen.

11. The PCAP touchscreen of claim 10, wherein the processing circuitry is further configured to determine a position of a conductive object relative to the PCAP touchscreen based on a detected change in capacitance of the electrostatic field.

12. The PCAP touchscreen of claim 10, wherein the processing circuitry is further configured to:
determine one or more parameters for the array of conductive sensors, the one or more parameters comprising at least one of:
a transmit/receive sequence for the array of conductive sensors;
a resolution for the array of conductive sensors;
an electrical current with which to electrically drive the array of conductive sensors; and
a scanning frequency at which the electrostatic field will be scanned to detect changes in capacitance; and
read the encoded data stored on the magnetic stripe card according to the one or more parameters when the PCAP touchscreen is in the MSR mode.

13. The PCAP touchscreen of claim 10, wherein the processing circuitry is further configured to determine a swipe direction of the magnetic stripe card relative to the PCAP touchscreen based on a detected direction of movement of the conductive object relative to the PCAP touchscreen.

14. The PCAP touchscreen of claim 10, wherein the processing circuitry is further configured to selectively activate a MSR function associated with the PCAP touchscreen to enable the MSR mode of the PCAP touchscreen.

15. The PCAP touchscreen of claim 9, wherein the processing circuitry is further configured to process a Point-of-Sale (POS) transaction based on the encoded data retrieved from the magnetic stripe card.

16. The PCAP touchscreen of claim 15, wherein the processing circuitry is further configured to electrically drive the second subarray of conductive sensors to generate the PCAP magnetic field based on a stage of the POS transaction.

17. A non-transitory computer readable medium comprising a control program stored therein, that when executed by processing circuitry of a projected capacitive (PCAP) touchscreen, causes the PCAP touchscreen to:
partition an array of conductive sensors of the PCAP touchscreen into first and second subarrays of conductive sensors, wherein the first and second subarrays of conductive sensors are different from each other and arranged as respective matrices, each matrix comprising a first layer of conductive sensors configured to generate an electrostatic field and a second layer of conductive sensors configured to detect deviations in the electrostatic field;
electrically drive:
the first subarray of conductive sensors to generate the electrostatic field for detecting a presence of a conductive object; and
the second subarray of conductive sensors to generate a PCAP magnetic field; and
retrieve encoded data stored on a magnetic stripe card positioned proximate the PCAP touchscreen based on detected changes in the PCAP magnetic field.

* * * * *